May 15, 1934.  C. H. DUFFY  1,958,423
RADIO LOUD SPEAKER
Filed Dec. 15, 1932   3 Sheets-Sheet 1

Inventor
C. HUGH DUFFY

May 15, 1934.  C. H. DUFFY  1,958,423
RADIO LOUD SPEAKER
Filed Dec. 15, 1932   3 Sheets-Sheet 2

Inventor
C. HUGH DUFFY
Francis H. Vanderwerker
By Wade Koritz
Attorneys

May 15, 1934.     C. H. DUFFY     1,958,423
RADIO LOUD SPEAKER
Filed Dec. 15, 1932     3 Sheets-Sheet 3

Patented May 15, 1934

1,958,423

UNITED STATES PATENT OFFICE 1,958,423

RADIO LOUD SPEAKER

Charles Hugh Duffy, Miami, Fla.

Application December 15, 1932, Serial No. 647,348

112 Claims. (Cl. 181—31)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio loud speakers or the like, and has for its object to provide a system for the reproduction of sound wherein the vibratory diaphragm is compelled to move bodily in response to the sound producing pulsations impressed upon it.

In some diaphragms, it is inherent in their structure that a part or portion of the diaphragm be clamped or otherwise restrained against movement. In such constructions the sound producing vibrations are created by flexures of the diaphragm itself. Such flexures of the diaphragm in turn create parasitic vibrations in the diaphragm causing it to vibrate wholly or partly out of step with the impressed pulsations and also in resonance with the fundamental or periodic frequency of the diaphragm. Distortion results from such structures, to the end that the purity of the reproduced sound is impaired, while the resonance created as the frequency of the impressed pulsations reaches the value of the fundamental or periodic frequency of the diaphragm results in the introduction of improper harmonics and an unnatural peaking of the response. This creates over emphasis and unpleasant distortion.

In other forms of diaphragms, such for instance as of the conventional free edge cone type, the action of the diaphragm is not intended to be due to any flexure of the diaphragm. In those it is the intention that the cone shall move bodily as a piston. The pulsations being impressed at the apex or smallest part of the cone, and the greatest mass of the diaphragm being at the base or rim of the cone, and the greatest air resistance being also at the base or rim of the cone, this inertia of the base or rim of the cone coupled with the maximum air resistance at that portion of the cone resists pulsating movement of the base or rim portion of the cone, at least sufficiently to create a slight flexure of the cone. Thus the intended bodily or piston movement of the cone is not in fact accomplished, and more or less distortion is introduced into the reproduction. This invention consists in the arrangement of a diaphragm having the following principal characteristics:

1st. No part nor portion of the diaphragm is clamped or otherwise held against free movement in step with the sound producing pulsations impressed upon it.

2nd. The sound producing vibrations are not created by a flexure of the diaphragm at any part or portion thereof.

3rd. The diaphragm is entirely floated on the diaphragm pulsating devices, and

4th. There is no substantial part of the diaphragm to be influenced by inertia or air resistance to cause flexure in the diaphragm or other movement out of step with the sound producing pulsations impressed thereon. Specifically the invention will be hereinafter more fully described.

Referring to the accompanying drawings—

Like numerals of reference indicate the same parts throughout the several figures, in which.

1 indicates the diaphragm which may be of any suitable diaphragm material.

Figure 1:
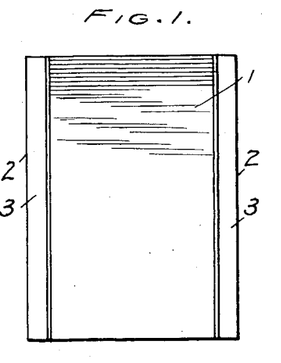
Figure 1 is a plan view of one example of the diaphragm in its initial flat position.
Figure 2:
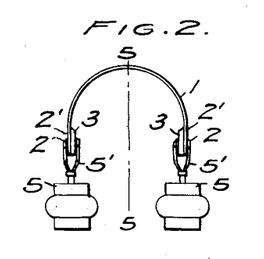
Figure 2 is an edge view of the diaphragm flexed into substantially semi-cylindrical formation.

As shown in Figure 1, the diaphragm 1 is a flat sheet and flexed into preferably semi-cylindrical formation as shown in Figure 2. As shown in Figures 1 and 2 the longitudinal edges 2 of the diaphragm are preferably extended beyond the normal curvature of the semi-cylindrical formation to form two flat parallel extensions 2' to which are secured stiffening members 3 of suitable light but stiff material such for instance as laminated balsa wood. The purpose of these members 3 is to render the longitudinal edge portions 2 of the diaphragm substantially rigid so as to prevent flexure and insure bodily movement of each of the longitudinal edge portions 2, exactly in step with the impressed pulsations.

Figure 3:
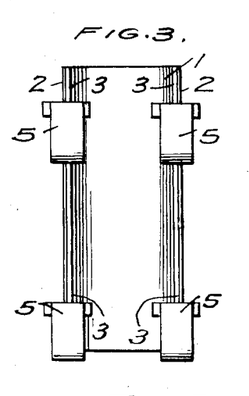
Figure 3 is a rear elevation of the same.
Figure 4:
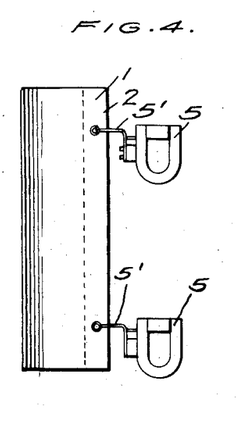
Figure 4 is a side elevation of the diaphragm.
Figure 5:
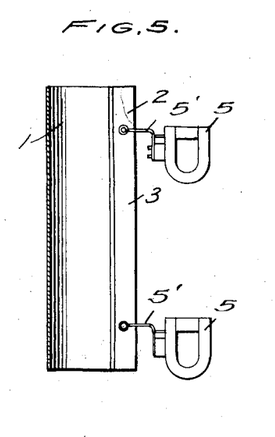
Figure 5 is a vertical sectional view taken through the diaphragm on line 5—5 of Figure 2.
Figure 6:
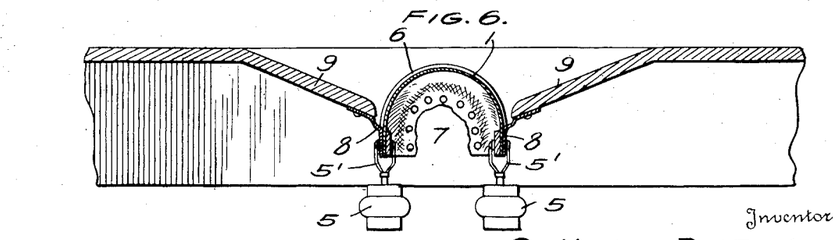
Figure 6 is a transverse sectional view through the diaphragm and front of cabinet or baffle board.
Figure 7:
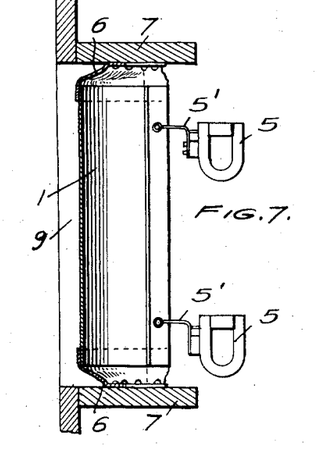
Figure 7 is a vertical sectional view through the same.
Figure 8:
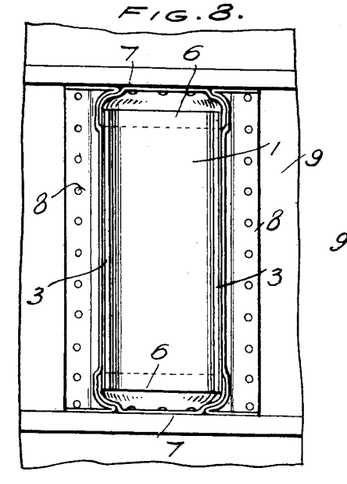
Figure 8 is a rear elevation of the diaphragm and rear of cabinet or baffle board.
Figure 9:
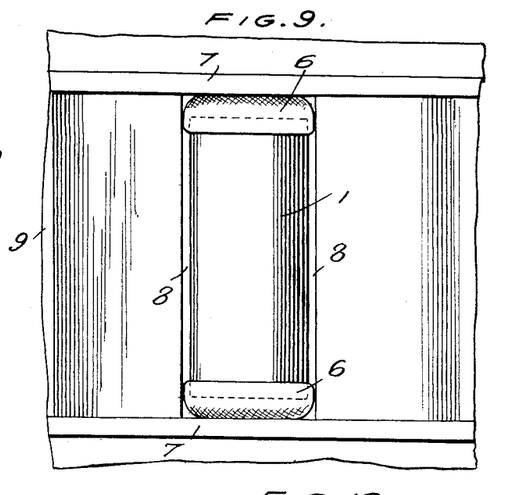
Figure 9 is a front elevation of the diaphragm and front of cabinet or baffle board.

A plurality of pulsating current impulse responsive devices, or pulsation impressing devices 5 of any suitable type are secured to the two longitudinal edge portions 2 of the diaphragm 1 by suitable connections 5'. In the example shown in Figure 3 of the drawings, four such devices 5 are shown, two at each longitudinal edge portion 2, all of which devices are connected in parallelism to the diaphragm structure, the directions of movements of which are in parallelism so as to impart bodily movement to the diaphragm without flexing the diaphragm.

The diaphragm being suitably connected to the devices 5 as shown in this example in the drawings, it becomes evident that the entire diaphragm is floated on the devices 5 and does not depend on nor require any further or additional support from any extraneous supporting device.

In operation the devices 5 simultaneously impress their sound producing pulsations to each of the substantially rigid longitudinal edge portions 2, so that the entire diaphragm structure 1 pulsates as a unit and as a piston entirely in step with the pulsations impressed upon it by the devices 5 pulsating in unison.

The result is that there is no lag of any portion of the diaphragm, and no flexure of the diaphragm to create parasitic or periodic vibrations to detract from the purity of the reproduced sound or to peak the response.

To prevent interference at the lower ranges and thereby prevent loss of audibility, it is advantageous to baffle the diaphragm. This may be accomplished in various ways. One example is shown in the drawings. In this example there is attached, as by a suitable adhesive, a strip 6 of soft, light, highly pliable material, such as chamois skin at each of the top and bottom edges of the diaphragm. Each of these strips or pieces 6 is then suitably fastened to an extending ledge or shelf 7, which ledges or shelves are spaced away from the adjacent top and bottom edges of the diaphragm.

Likewise, a similar strip of soft, pliable material 8 is secured to each longitudinal edge portion 2 of the diaphragm and each of these strips 8 is fastened to the front 9 of a cabinet or other baffle on each side of the diaphragm. The light pliable material so employed permits free and unrestricted movement of the diaphragm 1 as a unit in any direction and neither serves to center nor support the diaphragm in any sense.

It must be remembered that the principal object of this invention is the accomplishment of an assembly wherein the diaphragm is not subjected to any restraint which will flex or distort the same when the diaphragm is being subjected to impressed pulsations.

Figure 10:
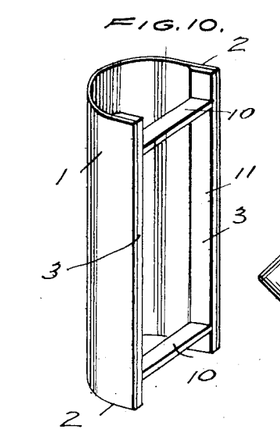
Figure 10 is a perspective view of a modification.
Figure 11:
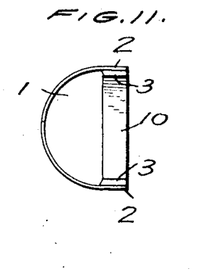
Figure 11 is a top plan view of the same.

Therefore it may be advisable, in order to increase the rigidity of the diaphragm, to connect the stiffening members 3 together at two or more points as by light but stiff cross pieces 10, as shown in Figures 10 and 11.

Such connecting pieces 10 when suitably connected to the stiffening members 3 form, in effect, a rigid frame 11, in which the vertical members 3 thereof are definitely spaced apart and permanently maintained in such spaced relation so that in operation, the vertical stiffening members 3 cannot move relatively to each other. When, therefore, pulsations are impressed upon the vertical stiffening members 3, the entire frame moves bodily and with it the diaphragm. This action is in contrast to that of a diaphragm whose terminal edges are clamped against movement by a frame and which must pulsate relatively to the frame through flexure of the diaphragm.

In the example shown, the formation of the diaphragm 1 into a substantially semi-cylindrical contour, imparts stability and rigidity thereto, to the end that the impressed pulsations do not have the effect of flexing or otherwise distorting the initial curvature of the diaphragm, but tends to assure bodily movement thereof exactly in step with the impressed pulsations and without any lag or flexure of any part or portion of the diaphragm.

Figure 12:
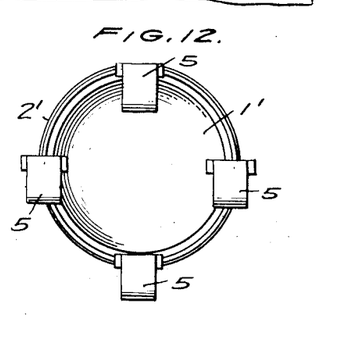
Figure 12 is a rear elevation illustrating the application of the invention to a cone shaped diaphragm.
Figure 13:
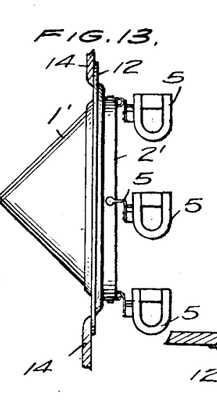
Figure 13 is a side elevation of the same.
Figure 14:
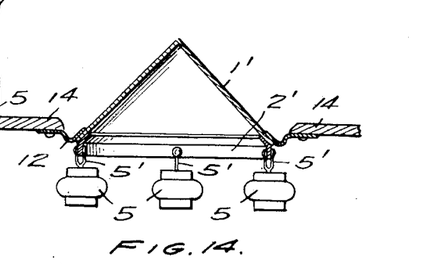
Figure 14 is a horizontal sectional view through the same.

The foregoing example of a diaphragm is illustrative of those which are of rectangular shape. Obviously the principle of operation may be applied to diaphragms of any shape such for instance a circular cone-shaped diaphragm, as shown in Figures 12, 13 and 14.

Such a diaphragm indicated by the reference numeral 1', should preferably be provided with a stiff substantially rigid ring 2' at the rim of the cone, which ring forms, in effect, a frame. The impulse responsive devices 5 may be connected to the substantially rigid ring 2' of the cone, at two diametrically opposite points; at four diametrically opposite points; at three equally spaced points, or at any other desired points about the rim of the cone, as will be apparent from Figure 12.

The location of these points and the number of impulse impressing devices are not material so long as the entire structure is wholly floated on the impulse impressing devices, and is not dependent upon extraneous support.

In this example of the invention, a strip of light pliable material 12, such as chamois skin is preferably connected at the stiffening ring 2' at the rim of the cone as by cement or otherwise, and the outer portion of this strip is in turn connected to a baffle 14 so as to permit free and unrestrained movement of the diaphragm.

It will be noted that the mass and consequent inertia of the diaphragm diminishes toward the apex of the cone, and that the structure presents no such possibility for flexure or distortion of the cone as is always present in conventional assemblies of free edge cones having an impulse impressing device at its apex, and its maximum resistance at its rim.

It is to be further noted that in addition to the fact that the greatest mass and greatest inertia in such conventional free edge cone assembly is at the rim of the cone, there is added the mass and inertia of that part of the structure which connects the cone proper to the conventional baffle. The sum of these masses and inertiæ which normally tend to resist and do resist the movement of the rim of the cone and cause the rim portion to lag and pulsate out of step with the apex of the cone, is totally absent from the assembly illustrated in Figures 12, 13 and 14 just described. This is true because in the latter the diaphragm is not positioned between the point of impressed pulsations and the location of its greatest mass and inertia; while in the former or conventional assembly, the driving force is applied at the apex of the cone and encounters its greatest resistance at the rim. Flexure and distortion of the cone is set up; a portion of the cone pulsates out of step with the impressed pulsations; parasitic vibrations are created and the purity of the reproduced sound is impaired.

Since material suitable for diaphragms must be light in weight, their inherent stiffness is not great. In order to combine maximum stiffness with minimum weight, it may be found advisable to flute the diaphragms as shown in Figures 15 to 20, inclusive.

Figure 15:
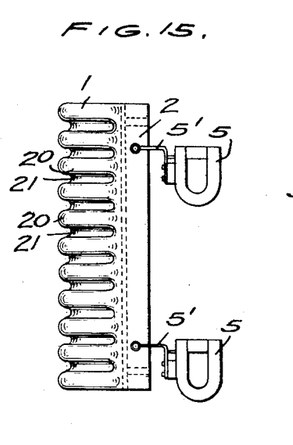
Figure 15 is a side elevation of a diaphragm showing a further modification.
Figure 16:
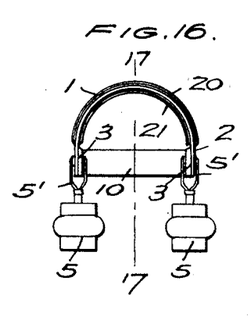
Figure 16 is a top plan view of the same.
Figure 17:
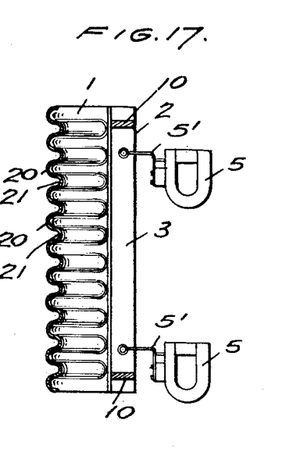
Figure 17 is a vertical sectional view through the same.

The substantially semi-cylindrical diaphragm shown in Figures 15—16 and 17 should have the diaphragm material fluted circumferentially so as to provide alternate circumferential beads and grooves 20 and 21. In the cone-shaped example shown in Figures 18, 19 and 20, the material should be fluted, not annularly, but from the apex toward the base or rim, so that the cone presents a surface of alternate beads and grooves 22 and 23 radiating from the apex of the cone formation.

Figures 18, 19, 20:
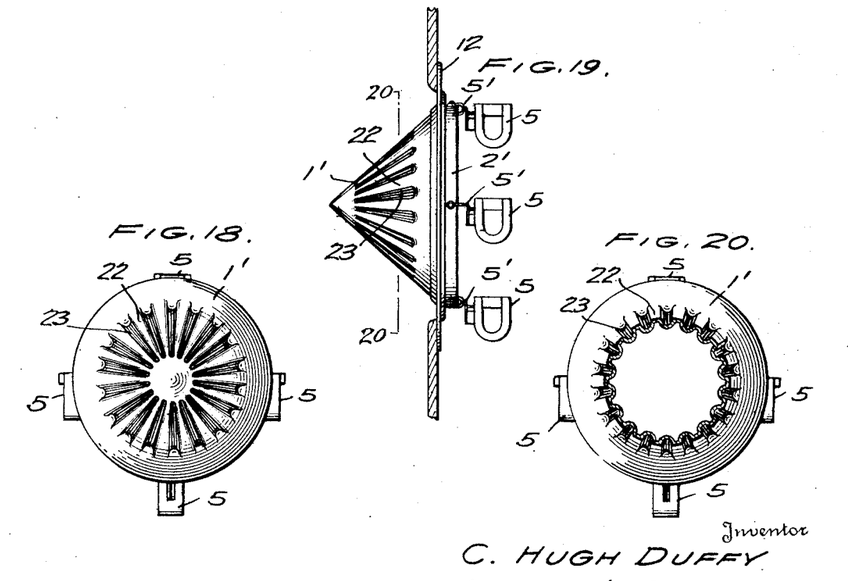
Figure 18 is a front elevation of a cone-shaped diaphragm showing a further modification.
Figure 19 is a side elevation of the same.
Figure 20 is a vertical sectional view on line 20—20 of Figure 19.

This construction is not to be confounded with the conventional practice of fluting cone diaphragms annularly so that the beads and grooves lie in parallel relation with the rim or base of the cone. Whatever stiffening effect such formations has on the cone, it detracts from the stiffness or rigidity of the cone in the direction of its principal axis and actually invites flexure or compression of the cone in that direction. It is for the purpose of increasing the stiffness and rigidity of the cone diaphragm in the direction of its principal axis and in the direction of its normal movement that the specific fluting of the cone surface as shown in Figures 18, 19 and 20 is herein suggested.

Having thus described some examples of the invention, what I claim as new and desire to secure by Letters Patent of the United States, is:

1. A radio loud speaker or the like, including a diaphragm, a plurality of pulsation impressing devices the directions of movements of which are in parallelism, and means for connecting all of said devices in parallelism at different points of the diaphragm structure to float the diaphragm on such devices, the diaphragm being restrained and restricted in its bodily movement only by the pulsation impressing devices.

2. A radio loud speaker or the like including a diaphragm, a plurality of pulsation impressing devices the directions of movements of which are in parallelism, and means for connecting all of said devices in parallelism at terminal points of the diaphragm structure to float the diaphragm on such devices, the diaphragm being restrained and restricted in its bodily movement only by the pulsation impressing devices.

3. A radio loud speaker or the like including a diaphragm, a plurality of pulsation impressing devices the directions of movements of which are in parallelism, and means for connecting all of said devices in parallelism to terminal points of the diaphragm structure to bodily float the entire diaphragm structure on such devices.

4. A radio loud speaker or the like including a diaphragm, a plurality of pulsation impressing devices the directions of movements of which are in parallelism, and means for connecting all of said devices in parallelism to different points of the diaphragm structure to bodily float the entire diaphragm structure on all of said devices.

5. A radio loud speaker or the like, including a diaphragm, a plurality of pulsation impressing devices the directions of movements of which are in parallelism, means for connecting all of said devices in parallelism to different points of the diaphragm structure to float the diaphragm on such devices, the diaphragm being restrained and restricted in its bodily movement only by the pulsation impressing devices, and baffling means for the diaphragm.

6. A radio loud speaker or the like, including a diaphragm, a plurality of pulsation impressing devices the directions of movements of which are in parallelism, means for connecting all of said devices in parallelism to terminal points of the diaphragm structure to bodily float the entire diaphragm structure on such devices, and baffling means for the diaphragm.

7. A radio loud speaker or the like, including a diaphragm, a plurality of pulsation impressing devices the directions of movements of which are in parallelism, means for connecting all of said devices in parallelism to different points of the diaphragm structure to bodily float the entire diaphragm structure on such devices, and baffling means for the diaphragm.

8. A radio loud speaker or the like, including a diaphragm of suitable sheet material flexed into a single substantially semi-cylindrical formation, a plurality of pulsation impressing devices the directions of movements of which are in parallelism, and means for connecting all of said devices in parallelism to different points of the diaphragm structure to float the diaphragm structure on such devices, the diaphragm being restrained and restricted only by the pulsation impressing devices.

9. A radio loud speaker or the like, including a diaphragm of a single substantially semi-cylindrical formation, a plurality of pulsation impressing devices, and means for connecting all of said devices in parallelism at the longitudinal terminal edges of the diaphragm structure to float the diaphragm structure on such devices, the diaphragm being restrained and restricted only by the pulsation impressing devices.

10. A radio loud speaker or the like, including a diaphragm of substantially semi-cylindrical formation, a plurality of pulsation impressing devices, and means for connecting all of said devices in parallelism to different points of each of the longitudinal terminal edges of the diaphragm structure to float the diaphragm structure on such devices.

11. A radio loud speaker or the like, including a diaphragm of substantially semi-cylindrical formation, a plurality of pulsation impressing devices the directions of movements of which are in parallelism, and means for connecting the same in parallelism to the longitudinal terminal edges of the diaphragm structure to pulsate the terminal edges of the diaphragm in parallelism.

12. A radio loud speaker or the like, including a diaphragm of substantially semi-cylindrical formation, means for stiffening the longitudinal terminal edges of the diaphragm formation, a plurality of pulsation impressing devices the directions of movements of which are in parallelism, and means for connecting the devices in parallelism at the longitudinal terminal edges of the diaphragm structure.

13. A radio loud speaker or the like, including a diaphragm of substantially semi-cylindrical formation, means for stiffening the longitudinal terminal edges of the diaphragm formation, a plurality of pulsation impressing devices the directions of movements of which are in parallelism, and means for connecting the devices to different points at each of the longitudinal terminal edges of the diaphragm structure.

14. A radio loud speaker or the like, including a diaphragm of suitable sheet material flexed into a single substantially partially cylindrical formation, a stiffening member at the longitudinal terminal edges of the formation, a plurality of pulsation impressing devices the directions of movements of which are in parallelism, and means for connecting the devices in parallelism to different points of the diaphragm structure to float the diaphragm structure on such devices.

15. A radio loud speaker or the like, including a diaphragm of a single substantially partially cylindrical formation, a stiffening member at the longitudinal terminal edges of the formation, a plurality of pulsation impressing devices, and means for connecting the devices in parallelism to the longitudinal terminal edges of the diaphragm structure to float the diaphragm structure on the devices.

16. A radio loud speaker or the like, including a diaphragm of substantially partially cylindrical formation, a stiffening member at the longitudinal terminal edges of the formation, a plurality of pulsation impressing devices, and means for connecting the devices in parallelism to different points of each of the longitudinal terminal edges of the diaphragm structure to float the diaphragm structure on the devices.

17. A radio loud speaker or the like, including a diaphragm of substantially partially cylindrical formation, a stiffening member at the longitudinal terminal edges of the diaphragm formation, a plurality of pulsation impressing devices, and means for connecting the same in parallelism to the longitudinal terminal edges of the diaphragm structure.

18. A radio loud speaker or the like, including a diaphragm of substantially partially cylindrical formation, means for stiffening the longitudinal terminal edges of the diaphragm formation, a plurality of pulsation impressing devices the directions of movements of which are in parallelism, and means for connecting the devices in parallelism to the longitudinal terminal edges of the diaphragm structure.

19. A radio loud speaker or the like, including a diaphragm of substantially partially cylindrical formation, means for stiffening the longitudinal terminal edges of the diaphragm formation, a plurality of pulsation impressing devices the directions of movements of which are in parallelism, and means for connecting the devices in parallelism to different points of each of the longitudinal terminal edges of the diaphragm structure.

20. A radio loud speaker or the like, including a diaphragm of substantially partially cylindrical formation, a plurality of pulsation impressing devices the directions of movements of which are in parallelism, and means for connecting the devices in parallelism to the longitudinal terminal edges of the diaphragm structure.

21. A radio loud speaker or the like, including a diaphragm of substantially partially cylindrical formation, a plurality of pulsation impressing devices the directions of movements of which are in parallelism, and means for connecting the devices in parallelism at different points of each of the longitudinal terminal edges of the diaphragm formation.

22. A radio loud speaker or the like, including a diaphragm driven at terminal points thereof, the diaphragm being restrained and restricted against movement only by the means that drives it, driving means for the diaphragm, the directions of movement of which are in parallelism and means for connecting the driving means to the diaphragm structure in parallelism.

23. A radio loud speaker or the like, including a diaphragm of suitable sheet material flexed into a single substantially semi-cylindrical formation, a plurality of pulsation impressing devices the directions of movements of which are in parallelism, and means for connecting all of said devices in parallelism to different points of the diaphragm structure to float the diaphragm structure on such devices, the diaphragm being restrained and restricted only by the pulsation impressing devices, baffling means for the diaphragm including pliable means at the terminal edges of the diaphragm.

24. A radio loud speaker or the like, including a diaphragm of a single substantially semi-cylindrical formation, a plurality of pulsation impressing devices the directions of movements of which are in parallelism, and means for connecting all of said devices in parallelism at the longitudinal terminal edges of the diaphragm structure to float the diaphragm structure on such devices, the diaphragm being restrained and restricted only by the pulsation impressing devices, baffling means for the diaphragm including pliable means at the terminal edges of the diaphragm.

25. A radio loud speaker or the like, including a diaphragm of substantially semi-cylindrical formation, a plurality of pulsation impressing devices the directions of movements of which are in parallelism, and means for connecting all of said devices in parallelism to different points of each of the longitudinal terminal edges of the diaphragm structure to float the diaphragm structure on such devices, baffling means for the diaphragm including pliable means at the terminal edges of the diaphragm.

26. A radio loud speaker or the like, including a diaphragm of substantially semi-cylindrical formation, a plurality of pulsation impressing devices the directions of movements of which are in parallelism, and means for connecting the same in parallelism to the longitudinal terminal edges of the diaphragm structure, baffling means for the diaphragm including pliable means at the terminal edges of the diaphragm.

27. A radio loud speaker or the like, including a diaphragm of substantially semi-cylindrical formation, means for stiffening the longitudinal terminal edges of the diaphragm formation, a plurality of pulsation impressing devices the directions of movements of which are in parallelism, and means for connecting the devices in parallelism at the longitudinal terminal edges of the diaphragm structure, baffling means for the diaphragm including pliable means at the terminal edges of the diaphragm.

28. A radio loud speaker or the like, including a diaphragm of substantially semi-cylindrical formation, means for stiffening the longitudinal terminal edges of the diaphragm formation, a plurality of pulsation impressing devices the directions of movements of which are in parallelism, and means for connecting the devices in parallelism to different points at each of the longitudinal terminal edges of the diaphragm structure, baffling means for the diaphragm including pliable means at the terminal edges of the diaphragm.

29. A radio loud speaker or the like, including a diaphragm of suitable sheet material flexed into a single substantially partially cylindrical formation, a stiffening member at the longitudinal terminal edges of the formation, a plurality of pulsations impressing devices the directions of movements of which are in parallelism, and means for connecting the devices in parallelism to different points of the diaphragm structure to float the diaphragm structure on such devices, baffling means for the diaphragm including pliable means at the terminal edges of the diaphragm.

30. A radio loud speaker or the like, including a diaphragm of a single substantially partially cylindrical formation, a stiffening member at the longitudinal terminal edges of the formation, a plurality of pulsation impressing devices the directions of movements of which are in parallelism, and means for connecting the devices in parallelism to the longitudinal terminal edges of the diaphragm structure to float the diaphragm structure on the devices, baffling means for the diaphragm including pliable means at the terminal edges of the diaphragm.

31. A radio loud speaker or the like, including a diaphragm of substantially partially cylindrical formation, a stiffening member at the longitudinal terminal edges of the formation, a plurality of pulsation impressing devices the directions of movements of which are in parallelism, and means for connecting the devices in parallelism to different points of each of the longitudinal terminal edges of the diaphragm structure to float the diaphragm structure on the devices, baffling means for the diaphragm including pliable means at the terminal edges of the diaphragm.

32. A radio loud speaker or the like, including a diaphragm of substantially partially cylindrical formation, a stiffening member at the longitudinal terminal edges of the diaphragm formation, a plurality of pulsations impressing devices the directions of movements of which are in parallelism, and means for connecting the same in parallelism to the longitudinal terminal edges of the diaphragm structure, baffling means for the diaphragm including pliable means at the terminal edges of the diaphragm.

33. A radio loud speaker or the like, including a diaphragm of substantially partially cylindrical formation, means for stiffening the longitudinal terminal edges of the diaphragm formation, a plurality of pulsation impressing devices the directions of movements of which are in parallelism, and means for connecting the devices in parallelism to the longitudinal terminal edges of the diaphragm structure, baffling means for the diaphragm including pliable means at the terminal edges of the diaphragm.

34. A radio loud speaker or the like, including a diaphragm of substantially partially cylindrical formation, means for stiffening the longitudinal terminal edges of the diaphragm formation, a plurality of pulsation impressing devices the directions of movements of which are in parallelism, and means for connecting the devices in parallelism to different points of each of the longitudinal terminal edges of the diaphragm structure, baffling means for the diaphragm including pliable means at the terminal edges of the diaphragm.

35. A radio loud speaker or the like, including a diaphragm of substantially partially cylindrical formation, a plurality of pulsation impressing devices the directions of movements of which are in parallelism, and means for connecting the devices in parallelism to the longitudinal terminal edges of the diaphragm structure, baffling a means for the diaphragm including pliable means at the terminal edges of the diaphragm.

36. A radio loud speaker or the like, including a diaphragm of substantially partially cylindrical formation, a plurality of pulsation impressing devices, the directions of movements of which are in parallelism and means for connecting the devices in parallelism at different points of each of the longitudinal terminal edges of the diaphragm formation, baffling means for the diaphragm including pliable means at the terminal edges of the diaphragm.

37. A radio loud speaker or the like, including a diaphragm driven at terminal points thereof, the diaphragm being restrained and restricted against movement only by the means that drives it, driving means for the diaphragm, and means for connecting the driving means to the diaphragm structure in parallelism, baffling means for the diaphragm including pliable means at the terminal edges of the diaphragm.

38. A radio loud speaker or the like, including a cone-shaped diaphragm, a plurality of pulsation impressing devices, and means for connecting such devices at different points of the diaphragm structure to float the diaphragm on such devices, the diaphragm being restrained and restricted in its bodily movement only by the pulsation impressing devices.

39. A radio loud speaker or the like, including a cone-shaped diaphragm, a plurality of pulsation impressing devices, and means for connecting such devices at different points of the rim of the diaphragm structure to float the diaphragm on such devices, the diaphragm being restrained and restricted in its bodily movement only by the pulsation impressing devices.

40. A radio loud speaker or the like, including a cone-shaped diaphragm, a plurality of pulsation impressing devices, and means for connecting such devices to different points of the diaphragm structure to bodily float the diaphragm structure on such devices.

41. A radio loud speaker or the like, including a cone-shaped diaphragm, pulsation impressing means, and means for connecting the pulsation impressing means at the rim of the diaphragm structure.

42. A radio loud speaker or the like, including a cone-shaped diaphragm, a plurality of pulsation impressing devices, means for connecting such devices to different points of the diaphragm structure to float the diaphragm on such devices, the diaphragm being restrained and restricted in its bodily movement only by the pulsation impressing devices, and baffling means for the diaphragm.

43. A radio loud speaker or the like including a cone-shaped diaphragm, a plurality of pulsation impressing devices, means for connecting such devices at portions of the diaphragm structure remote from the apex to bodily float the entire diaphragm structure on such devices.

44. A radio loud speaker or the like, including a cone-shaped diaphragm, a stiffening member at the rim portion of the diaphragm, a plurality of pulsation impressing devices, and means for connecting such devices to the stiffening members at the rim of the diaphragm to float the diaphragm structure on such devices.

45. A radio loud speaker or the like, including a cone-shaped diaphragm, a stiffening member at the rim portion of the diaphragm, a plurality of pulsation impressing devices, and means for connecting the same at the rim portion of the diaphragm structure.

46. A radio loud speaker or the like, including a cone-shaped diaphragm, a stiffening member at the rim portion of the diaphragm, a plurality of pulsation impressing devices, and means for connecting the devices to different points of the stiffening member at the rim portion of the diaphragm.

47. A radio loud speaker or the like, including a cone-shaped diaphragm, a plurality of pulsation impressing devices, and means for connecting the devices at the rim portion of the cone-shaped diaphragm.

48. A radio loud speaker or the like, including a cone-shaped diaphragm driven at the rim portion thereof, the diaphragm being restrained and restricted against movement only by the means that drives it, driving means at the rim portion of the diaphragm, and means for connecting the driving means with the diaphragm structure.

49. A radio loud speaker or the like, including a cone-shaped diaphragm, a plurality of pulsation impressing devices, and means for connecting such devices at different points of the diaphragm structure to float the diaphragm on such devices, the diaphragm being restrained and restricted in its bodily movement only by the pulsation impressing devices, baffling means for the diaphragm including pliable means at the rim portion of the diaphragm.

50. A radio loud speaker or the like, including a cone-shaped diaphragm, a plurality of pulsation impressing devices, and means for connecting such devices at different points of the rim of the diaphragm structure to float the diaphragm on such devices, the diaphragm being restrained and restricted in its bodily movement only by the pulsation impressing devices, baffling means for the diaphragm including pliable means at the rim portion of the diaphragm.

51. A radio loud speaker or the like, including a cone-shaped diaphragm, a plurality of pulsation impressing devices, and means for connecting such devices to different points of the diaphragm structure to bodily float the diaphragm structure on such devices, baffling means for the diaphragm including pliable means at the rim portion of the diaphragm.

52. A radio loud speaker or the like, including a cone-shaped diaphragm, pulsation impressing means, and means for connecting the pulsation impressing means at the rim of the diaphragm structure, baffling means for the diaphragm including pliable means at the rim portion of the diaphragm.

53. A radio loud speaker or the like, including a cone-shaped diaphragm, a plurality of pulsation impressing devices, means for connecting such devices at portions of the diaphragm structure remote from the apex to bodily float the entire diaphragm structure on such devices, baffling means for the diaphragm including pliable means at the rim portion of the diaphragm.

54. A radio loud speaker or the like, including a cone-shaped diaphragm, a stiffening member at the rim portion of the diaphragm, a plurality of pulsation impressing devices, and means for connecting such devices to the stiffening member at the rim of the diaphragm to float the diaphragm structure on such devices, baffling means for the diaphragm including pliable means at the rim portion of the diaphragm.

55. A radio loud speaker or the like, including a cone-shaped diaphragm, a stiffening member at the rim portion of the diaphragm, a plurality of pulsation impressing devices, and means for connecting the same at the rim portion of the diaphragm structure, baffling means for the diaphragm including pliable means at the rim portion of the diaphragm.

56. A radio loud speaker or the like, including a cone-shaped diaphragm, a stiffening member at the rim portion of the diaphragm, a plurality of pulsation impressing devices, and means for connecting the devices to different points of the stiffening member at the rim portion of the diaphragm, baffling means for the diaphragm including pliable means at the rim portion of the diaphragm.

57. A radio loud speaker or the like, including a cone-shaped diaphragm, a plurality of pulsation impressing devices, and means for connecting the devices at the rim portion of the cone-shaped diaphragm, baffling means for the diaphragm including pliable means at the rim portion of the diaphragm.

58. A radio loud speaker or the like, including a cone-shaped diaphragm driven at the rim portion thereof, the diaphragm being restrained and restricted against movement only by the means that drives it, driving means at the rim portion of the diaphragm, and means for connecting the driving means with the diaphragm structure, baffling means for the diaphragm including pliable means at the rim portion of the diaphragm.

59. A radio loud speaker or the like, including a diaphragm, a frame for the diaphragm, a plurality of pulsation impressing devices, and means for connecting such devices at different points of the said frame to float the diaphragm and its frame on such devices, the diaphragm and its frame being restricted in their bodily movement only by the pulsation impressing devices.

60. A radio loud speaker or the like, including a diaphragm, a frame for the diaphragm, a plurality of pulsation impressing devices, and means for connecting such devices at different points of the diaphragm frame to bodily float the entire diaphragm and its frame on such devices.

61. A radio loud speaker or the like, including a diaphragm, a frame for the diaphragm, a plurality of pulsation impressing devices, means for connecting such devices at different points of the diaphragm frame to bodily float the entire diaphragm and its frame on such devices and baffling means for the diaphragm.

62. A radio loud speaker or the like, including a diaphragm of suitable sheet material flexed into a single substantially semi-cylindrical formation, a stiffening frame for the diaphragm, a plurality of pulsation impressing devices, and means for connecting such devices to different points of the diaphragm frame to float the diaphragm and its frame on such devices.

63. A radio loud speaker or the like, including a diaphragm of a single substantially semi-cylindrical formation, a stiffening frame for the diaphragm, a plurality of pulsation impressing devices, and means for connecting such devices to different points of the diaphragm to float the diaphragm and its frame on such devices.

64. A radio loud speaker or the like, including a diaphragm of substantially semi-cylindrical formation, a stiffening frame for the diaphragm, a plurality of pulsation impressing devices, and means for connecting such devices to different points of the diaphragm frame to float the diaphragm and its frame on such devices.

65. A radio loud speaker or the like, including a diaphragm of substantially semi-cylindrical formation, a plurality of pulsation impressing devices, a stiffening frame for the diaphragm, and means for connecting the devices to the diaphragm stiffening frame.

66. A radio loud speaker or the like, including a diaphragm, a stiffening frame for the diaphragm, and means for impressing sound producing pulsations directly on the diaphragm stiffening frame.

67. A radio loud speaker or the like, including a diaphragm of suitable sheet material flexed into a single substantially partially cylindrical formation, a stiffening frame for the diaphragm, a plurality of pulsation impressing devices, and means for connecting the devices to the diaphragm structure to float the diaphragm and its frame on such devices.

68. A radio loud speaker or the like, including a diaphragm of a single substantially partially cylindrical formation, a stiffening frame for the diaphragm, a plurality of pulsation impressing devices, and means for connecting the devices to the stiffening frame to float the diaphragm and its frame on the devices.

69. A radio loud speaker or the like, including a diaphragm of substantially partially cylindrical formation, a stiffening frame for the diaphragm, a plurality of pulsation impressing devices, and means for connecting the devices to different points of the stiffening frame to float the diaphragm and its frame on the devices.

70. A radio loud speaker or the like, including a diaphragm of substantially partially cylindrical formation, a stiffening frame for the diaphragm, and means for impressing pulsations on the stiffening frame of the diaphragm.

71. A radio loud speaker or the like, including a diaphragm driven at terminal points thereof, a stiffening frame for the diaphragm, the diaphragm and its frame being restrained and restricted against movement only by the means that drives them, driving means for the diaphragm and frame, and means for connecting the driving means with the diaphragm frame.

72. A radio loud speaker or the like, including a diaphragm, a frame for the diaphragm, a plurality of pulsation impressing devices, and means for connecting such devices at different points of the said frame to float the diaphragm and its frame on such devices, the diaphragm and its frame being restricted in their bodily movement only by the pulsation impressing devices, baffling means for the diaphragm, including pliable means at the terminal edges of the diaphragm.

73. A radio loud speaker or the like, including a diaphragm, a frame for the diaphragm, a plurality of pulsation impressing devices, and means for connecting such devices at different points of the diaphragm frame to bodily float the entire diaphragm and its frame on such devices.

74. A radio loud speaker or the like, including a diaphragm of suitable sheet material flexed into a single substantially semi-cylindrical formation, a stiffening frame for the diaphragm, a plurality of pulsation impressing devices, and means for connecting such devices to different points of the diaphragm frame to float the diaphragm and its frame on such devices, baffling means for the diaphragm, including pliable means at the terminal edges of the diaphragm.

75. A radio loud speaker or the like, including a diaphragm of a single substantially semi-cylindrical formation, a stiffening frame for the diaphragm, a plurality of pulsation impressing devices, and means for connecting such devices to different points of the diaphragm to float the diaphragm and its frame on such devices, baffling means for the diaphragm, including pliable means at the terminal edges of the diaphragm.

76. A radio loud speaker or the like, including a diaphragm of substantially semi-cylindrical formation, a stiffening frame for the diaphragm, a plurality of pulsation impressing devices, and means for connecting such devices to different points of the diaphragm frame to float the diaphragm and its frame on such devices, baffling means for the diaphragm including pliable means at the terminal edges of the diaphragm.

77. A radio loud speaker or the like, including a diaphragm of substantially semi-cylindrical formation, a plurality of pulsation impressing devices, a stiffening frame for the diaphragm, and means for connecting the devices to the diaphragm stiffening frame, baffling means for the diaphragm including pliable means at the terminal edges of the diaphragm.

78. A radio loud speaker or the like, including a diaphragm, a stiffening frame for the diaphragm, and means for impressing sound producing pulsations directly on the diaphragm stiffening frame, baffling means for the diaphragm including pliable means at the terminal edges of the diaphragm.

79. A radio loud speaker or the like, including a diaphragm of suitable sheet material flexed into a single substantially partially cylindrical formation, a stiffening frame for the diaphragm, a plurality of pulsation impressing devices, and means for connecting the devices to the diaphragm structure to float the diaphragm and its frame on such devices, baffling means for the diaphragm including pliable means at the terminal edges of the diaphragm.

80. A radio loud speaker or the like, including a diaphragm of a single substantially partially cylindrical formation, a stiffening frame for the diaphragm, a plurality of pulsation impressing devices, and means for connecting the devices to the stiffening frame to float the diaphragm and its frame on the devices, baffling means for the diaphragm including pliable means at the terminal edges of the diaphragm.

81. A radio loud speaker or the like, including a diaphragm of substantially partially cylindrical formation, a stiffening frame for the diaphragm, a plurality of pulsation impressing devices, and means for connecting the devices to different points of the stiffening frame to float the diaphragm and its frame on the devices, baffling means for the diaphragm including pliable means at the terminal edges of the diaphragm.

82. A radio loud speaker or the like, including a diaphragm of substantially partially cylindrical formation, a stiffening frame for the diaphragm, and means for impressing pulsations on the stiffening frame of the diaphragm, baffling means for the diaphragm including pliable means at the terminal edges of the diaphragm.

83. A radio loud speaker or the like, including a diaphragm driven at terminal points thereof, a stiffening frame for the diaphragm, the diaphragm and its frame being restrained and restricted against movement only by the means that drives them, driving means for the diaphragm and frame, and means for connecting the driving means with the diaphragm frame, baffling means for the diaphragm including pliable means at the terminal edges of the diaphragm.

84. A radio loud speaker or the like, including a cone-shaped diaphragm, a stiffening frame for the diaphragm, a plurality of pulsation impressing devices, and means for connecting such devices to the stiffening frame of the diaphragm to float the diaphragm and its frame on such devices.

85. A radio loud speaker or the like, including a cone-shaped diaphragm, a stiffening frame at the rim portion of the diaphragm, a plurality of pulsation impressing devices, and means for connecting such devices to different points of the stiffening frame to float the diaphragm and its frame on such devices.

86. A radio loud speaker or the like including a cone-shaped diaphragm, a stiffening frame at the rim portion of the diaphragm, a plurality of pulsation impressing devices, and means for connecting the devices at the rim portion of the cone-shaped diaphragm.

87. A radio loud speaker or the like, including a cone-shaped diaphragm driven at the rim portion thereof, a stiffening frame at the rim portion of the diaphragm, the diaphragm and its stiffening frame being restrained and restricted against movement only by the means that drives them, driving means at the rim portion of the diaphragm, and means for connecting the driving means with the diaphragm structure.

88. A radio loud speaker or the like, including a cone-shaped diaphragm, a stiffening frame at the rim portion of the diaphragm, and means for impressing pulsations at the rim portion of the diaphragm.

89. A radio loud speaker or the like, including a cone-shaped diaphragm, a stiffening frame for the diaphragm, a plurality of pulsation impressing devices, and means for connecting such devices to the stiffening frame of the diaphragm to float the diaphragm and its frame on such devices, and baffling means for the diaphragm including pliable means at the rim portion of the diaphragm.

90. A radio loud speaker or the like, including a cone-shaped diaphragm, a stiffening frame at the rim portion of the diaphragm, a plurality of pulsation impressing devices, and means for connecting such devices to different points of the stiffening frame to float the diaphragm and its frame on such devices, and baffling means for the diaphragm including pliable means at the rim portion of the diaphragm.

91. A radio loud speaker or the like including a cone-shaped diaphragm, a stiffening frame at the rim portion of the diaphragm, a plurality of pulsation impressing devices, and means for connecting the devices at the rim portion of the cone-shaped diaphragm, and baffling means for the diaphragm including pliable means at the rim portion of the diaphragm.

92. A radio loud speaker or the like, including a cone-shaped diaphragm driven at the rim portion thereof, a stiffening frame at the rim portion of the diaphragm, the diaphragm and its stiffening frame being restrained and restricted against movement only by the means that drives them, driving means at the rim portion of the diaphragm, and means for connecting the driving means with the diaphragm structure, and baffling means for the diaphragm including pliable means at the rim portion of the diaphragm.

93. A radio loud speaker or the like, including a cone-shaped diaphragm, a stiffening frame at the rim portion of the diaphragm, and means for impressing pulsations at the rim portion of the diaphragm, and baffling means for the diaphragm including pliable means at the rim portion of the diaphragm.

94. A radio loud speaker or the like according to claim 1, in which the diaphragm is characterized by having alternate beads and grooves.

95. A radio loud speaker or the like according to claim 3, in which the diaphragm is characterized by having alternate beads and grooves.

96. A radio loud speaker or the like, according to claim 7, in which the diaphragm is characterized by having alternate beads and grooves.

97. A radio loud speaker or the like, according to claim 8, in which the diaphragm is characterized by having alternate beads and grooves circumferentially of the diaphragm formation.

98. A radio loud speaker according to claim 9, in which the diaphragm is characterized by having alternate beads and grooves circumferentially of the diaphragm formation.

99. A radio loud speaker or the like according to claim 10, in which the diaphragm is characterized by having alternate beads and grooves circumferentially of the diaphragm formation.

100. A radio loud speaker or the like, according to claim 12, in which the diaphragm is characterized by having alternate beads and grooves circumferentially of the diaphragm formation.

101. A radio loud speaker or the like according to claim 14, in which the diaphragm is characterized by having alternate beads and grooves circumferentially of the diaphragm formation.

102. A radio loud speaker or the like, according to claim 21, in which the diaphragm is characterized by having alternate beads and grooves circumferentially of the diaphragm structure.

103. A radio loud speaker or the like, according to claim 22, in which the diaphragm is characterized by having alternate beads and grooves circumferentially of the diaphragm structure.

104. A radio loud speaker or the like, according to claim 23, in which the diaphragm is characterized by having alternate beads and grooves circumferentially of the diaphragm structure.

105. A radio loud speaker or the like, according to claim 37, in which the diaphragm is characterized by having alternate beads and grooves circumferentially of the diaphragm structure.

106. A radio loud speaker or the like, according to claim 38, in which the diaphragm is characterized by having alternate beads and grooves circumferentially of the diaphragm formation.

107. A radio loud speaker or the like, according to claim 39, in which the cone-shaped diaphragm is characterized by having alternate beads and grooves in the direction of the principal axis of the cone.

108. A radio loud speaker or the like, according to claim 40, in which the cone-shaped diaphragm is characterized by having alternate beads and grooves in the direction of the principal axis of the cone.

109. A radio loud speaker or the like, according to claim 41, in which the cone-shaped diaphragm is characterized by having alternate beads and grooves in the direction of the principal axis of the cone.

110. A radio loud speaker or the like, according to claim 49, in which the cone-shaped diaphragm is characterized by having alternate beads and grooves in the direction of the principal axis of the cone.

111. A radio loud speaker or the like, according to claim 58, in which the cone-shaped diaphragm is characterized by having alternate beads and grooves in the direction of the principal axis of the cone.

112. A radio loud speaker or the like, according to claim 59, in which the diaphragm is characterized by having alternate beads and grooves.

CHARLES HUGH DUFFY.